(12) United States Patent
Mano et al.

(10) Patent No.: US 10,066,531 B2
(45) Date of Patent: Sep. 4, 2018

(54) UREA WATER SUPPLY SYSTEM FOR CONSTRUCTION MACHINE

(71) Applicant: HITACHI CONSTRUCTION MACHINERY CO., LTD., Tokyo (JP)

(72) Inventors: Hidenori Mano, Tsuchiura (JP); Shohei Kamiya, Tsuchiura (JP); Toshinori Fujii, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/022,933

(22) PCT Filed: Feb. 19, 2015

(86) PCT No.: PCT/JP2015/054628
§ 371 (c)(1),
(2) Date: Mar. 18, 2016

(87) PCT Pub. No.: WO2015/141374
PCT Pub. Date: Sep. 24, 2015

(65) Prior Publication Data
US 2016/0230633 A1    Aug. 11, 2016

(30) Foreign Application Priority Data

Mar. 17, 2014    (JP) .................................. 2014-054000

(51) Int. Cl.
*F01N 3/00*    (2006.01)
*F01N 3/10*    (2006.01)
(Continued)

(52) U.S. Cl.
CPC .......... *F01N 3/2896* (2013.01); *E02F 9/0883* (2013.01); *F01N 3/2066* (2013.01);
(Continued)

(58) Field of Classification Search
CPC .. F01N 13/14; F01N 2610/02; F01N 2610/10; F01N 2610/11; F01N 2610/14;
(Continued)

(56) References Cited

U.S. PATENT DOCUMENTS 5,884,475 A * 3/1999 Hofmann ........... B01D 53/9431
                                                              60/274
7,647,767 B2 * 1/2010 Osaku ................... F01N 3/2066
                                                              60/286
(Continued)

FOREIGN PATENT DOCUMENTS

EP      2 172 626 A1     4/2010
JP      2009-243279 A   10/2009
(Continued)

OTHER PUBLICATIONS

Extended European Search Report received in corresponding European Application No. 15765284.3 dated Aug. 7, 2017.
(Continued)

*Primary Examiner* — Phutthiwat Wongwian
*Assistant Examiner* — Diem Tran
(74) *Attorney, Agent, or Firm* — Mattingly & Malur, PC

(57) ABSTRACT

In order to purify NOx in exhaust gas discharged from an engine, a urea water supply system is configured by a urea water injection valve, a urea water tank, urea water supply piping (22) and a urea water supply device (30). Cooling water piping (40) that allows cooling water of the engine to flow through is laid along the urea water supply piping (22), while the cooling water piping (40) is connected to the urea water supply device (30) at a connection portion (34) of an inflow pipe and a connection portion (35) of an outflow pipe, and a part (46) of the inflow pipe is installed to be close to connection portions (31, 32, 33) of the urea water supply piping (22) to the urea water supply device (30) within a
(Continued)

predetermined distance range in which heat of the cooling water reaches the connection portions.

3 Claims, 12 Drawing Sheets

(51) Int. Cl.
  *F01N 3/28* (2006.01)
  *F01N 3/20* (2006.01)
  *F01N 13/14* (2010.01)
  *E02F 9/08* (2006.01)
(52) U.S. Cl.
  CPC ............ *F01N 13/14* (2013.01); *F01N 3/2889* (2013.01); *F01N 2240/02* (2013.01); *F01N 2590/08* (2013.01); *F01N 2610/02* (2013.01); *F01N 2610/10* (2013.01); *F01N 2610/11* (2013.01); *F01N 2610/14* (2013.01); *F01N 2610/1406* (2013.01); *Y02T 10/24* (2013.01)
(58) Field of Classification Search
  CPC .. F01N 3/2066; F01N 3/2896; F01N 2240/02; F01N 2590/08; Y02T 10/24
  USPC .................................... 60/286, 298, 301, 303
  See application file for complete search history.

(56) References Cited

U.S. PATENT DOCUMENTS

| | | | |
|---|---|---|---|
| 8,875,502 B2* | 11/2014 | Fuchs | ................... F01N 3/2066 60/274 |
| 2008/0011780 A1* | 1/2008 | Cooke | ................... B01D 53/90 222/135 |
| 2010/0038162 A1 | 2/2010 | Kamiya et al. | |
| 2011/0030349 A1 | 2/2011 | Makartchouk et al. | |
| 2013/0145749 A1* | 6/2013 | Merchant | .............. F01N 3/2066 60/295 |
| 2013/0259755 A1 | 10/2013 | Kim et al. | |

FOREIGN PATENT DOCUMENTS

| | | | | |
|---|---|---|---|---|
| JP | 2010-132194 | | * 6/2010 | |
| JP | 2011-241734 A | | 12/2011 | |
| JP | 2012-225304 A | | 11/2012 | |
| JP | 2013-063734 | | * 4/2013 | ............... F01N 3/08 |
| JP | 2013-063734 A | | 4/2013 | |

OTHER PUBLICATIONS

International Search Report of PCT/JP2015/054628 dated May 19, 2015.

* cited by examiner

UREA WATER SUPPLY SYSTEM FOR CONSTRUCTION MACHINE

TECHNICAL FIELD

The present invention relates to a urea water supply system for a construction machine, and particularly relates to an art of preventing freezing of urea water or quickly defreezing frozen urea water.

BACKGROUND ART

A construction machine such as a hydraulic shovel is constructed by including a traveling structure capable of travelling by a traveling motor, a revolving superstructure that is disposed on the traveling structure, and a working device that is mounted to the revolving superstructure to perform an excavating work of earth and sand, or the like. The revolving superstructure has an operator's cab thereon located on one side in a width direction with a mounting section for the working device between both sides. Such a construction machine further has a hydraulic pump that is located on a rear side of the operator's cab to supply pressure oil to the traveling motor and the working device and an engine for operating the hydraulic pump. A typical engine to be mounted on a construction machine is a diesel engine.

Incidentally, in recent years, a urea SCR system has been known as the system which reduces NOx (nitrogen oxide) in the exhaust gas exhausted from a diesel engine, and purifies the exhaust gas, and the urea SCR system is being also applied to a diesel engine mounted on a construction machine.

A urea SCR system is a NOx selective catalytic reduction system that selectively reduces NOx in exhaust gas by using urea water as a reducing agent, and has a urea water injection valve that injects urea water to an exhaust upstream side of a NOx selective catalytic reduction apparatus, a urea water tank for storing the urea water, and a urea water supply device including a supply pump that is interposed in urea water supply piping that connects the urea water tank and the urea water injection valve to feed the urea water under pressure to the urea water injection valve.

In a cold district or the like, cooling water piping in which the cooling water for an engine is circulated is laid along urea water supply piping to be able to warm urea water with the heat of the cooling water for the engine, in order to prevent the urea water flowing in the urea water supply piping from being frozen in the winter season (see Patent Document 1).

PRIOR ART DOCUMENT

Patent Document

Patent Document 1: Japanese Patent Laid-Open No. 2009-243279

SUMMARY OF THE INVENTION

Problems to be Solved by the Invention

In the art disclosed in Patent Document 1 described above or the like, the urea water supply piping and the cooling water piping that allows the cooling water of the engine to circulate are connected to the urea water tank and the urea water supply device through connectors, and the cooling water piping cannot be laid along the urea water supply piping at the connector portions, whereby there arises the problem that the urea water is easily frozen at the connector portions.

The present invention is made in the light of the problem as above, and has an object to provide a urea water supply system for a construction machine that is designed to be able to prevent freezing of urea water in a connector portion of urea water supply piping of a urea water supply device or to be able to defreeze frozen urea water quickly by effectively using cooling water piping that allows cooling water of an engine to circulate.

Means for Solving the Problems

In order to attain the above described object, a urea water supply system for a construction machine according to the present invention includes an engine as a drive source placed on a revolving superstructure, a NOx selective catalytic reduction device interposed in an exhaust passage of the engine, a urea water injection valve that injects urea water to an exhaust upstream side of the NOx selective catalytic reduction device, a urea water tank that stores the urea water, urea water supply piping with one end connected to the urea water injection valve, and the other end connected to the urea water tank, a urea water supply device that is interposed in the urea water supply piping, and feeds the urea water under pressure to the urea water injection valve, and cooling water piping that extends along the urea water supply piping and allows cooling water of the engine to flow through, wherein the cooling water piping includes an inflow pipe and an outflow pipe, the inflow pipe and the outflow pipe are respectively connected to the urea water tank and the urea water supply device, and with respect to at least either one of a connection portion of the urea water supply piping to the urea water tank and a connection portion of the urea water supply piping to the urea water supply device, either one of a part of the inflow pipe and a part of the outflow pipe is installed to be close to the connection portion in a predetermined distance range in which heat of the cooling water reaches the connection portion.

It is preferable that in the urea water tank and the urea water supply device for which the cooling water piping is installed to be close to the connection portions, the urea water supply piping forms all the connection portions by being connected perpendicularly to same outer surfaces of the urea water tank and the urea water supply device, and either one of a part of the inflow pipe and a part of the outflow pipe of the cooling water piping is installed to extend along the outer surfaces to cross the connection portions.

It is preferable that either one of a part of the inflow pipe and a part of the outflow pipe of the cooling water piping is installed to surround the connection portions.

It is preferable that either one of a part of the inflow pipe and a part of the outflow pipe of the cooling water piping is installed parallel to sandwich the connection portions.

It is preferable to include a thermal insulating cover that covers the outer surfaces of the urea water tank and the urea water supply device, including the connection portions of the urea water supply piping and either one of a part of the inflow pipe and a part of the outflow pipe of the cooling water piping, and thermally insulates the connection portions.

Advantageous Effects of the Invention

According to the urea water supply system for a construction machine of the present invention, in order to purify NOx in exhaust gas discharged from the engine, the urea water supply system is configured by the urea water injection valve, the urea water tank, the urea water supply piping and the urea water supply device. The cooling water piping which allows the cooling water of the engine to flow through is laid along the urea water supply piping. In the cooling water piping, the inflow pipe and the outflow pipe are respectively connected to the urea water tank and the urea water supply device. With respect to at least either one of the connection portion of the urea water supply piping to the urea water tank and the connection portion of the urea water supply piping to the urea water supply device, either one of a part of the inflow pipe and a part of the outflow pipe is installed to be close to the connection portion in a predetermined distance range in which heat of the cooling water reaches the connection portion.

Accordingly, at least either one of the connection portion of the urea water supply piping to the urea water tank and the connection portion of the urea water supply piping to the urea water supply device is warmed by heat of the cooling water which flows in either one of a part of the inflow pipe and a part of the outflow pipe, and even in the connection portion of the urea water supply piping along which the cooling water piping cannot be laid, it is possible to prevent freezing of the urea water and defreeze frozen urea water efficiently.

Further, in the urea water tank and the urea water supply device in which the cooling water piping is installed to be close to the connection portions, the urea water supply piping forms all the connection portions by being connected perpendicularly to the same outer surfaces of the urea water tank and the urea water supply device, and either one of a part of the inflow pipe and a part of the outflow pipe of the cooling water piping is installed to extend along the outer surfaces to cross the connection portions. Therefore, even in the connection portion of the urea water supply piping along which the cooling water piping cannot be laid, it is possible to prevent freezing of the urea water and defreeze frozen urea water with a simple configuration.

Further, either one of a part of the inflow pipe and a part of the outflow pipe of the cooling water piping is installed to surround the connection portions, and therefore, at least either one of the connection portion of the urea water supply piping to the urea water tank and the connection portion of the urea water supply piping to the urea water supply device can be sufficiently warmed with the heat of the cooling water.

Further, a thermal insulating cover that thermally insulates the connection portions in such a manner as to cover the outer surfaces of the urea water tank and the urea water supply device, including the connection portions of the urea water supply piping and either one of a part of the inflow pipe and a part of the outflow pipe of the cooling water piping, and therefore, air inside the thermal insulating cover which is warmed by the heat of the cooling water is favorably warmed.

MODE FOR CARRYING OUT THE INVENTION

Hereinafter, one embodiment of a urea water supply system for a construction machine according to the present invention will be described based on the drawings.

Figure 1:
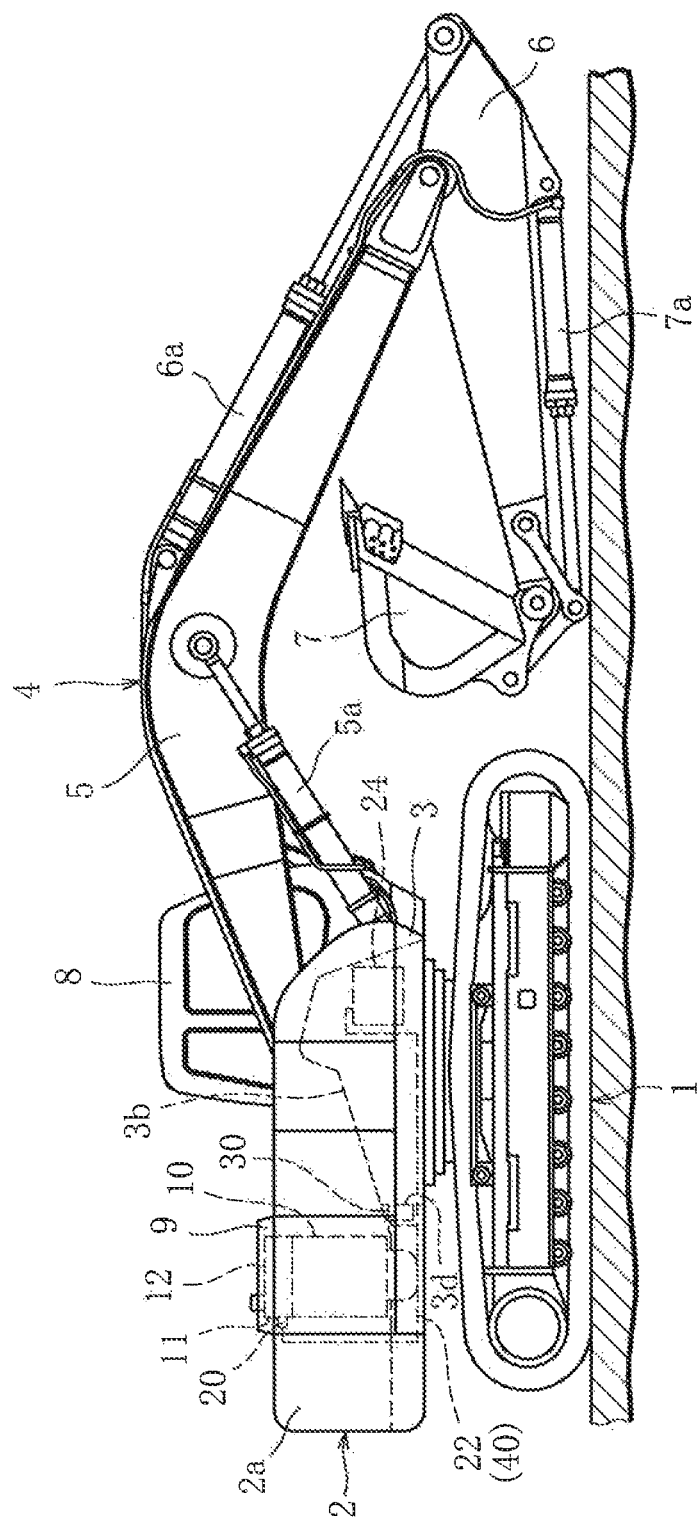
FIG. 1 is a side view showing an entire construction of a construction machine according to the present invention.

FIG. 1 shows the construction machine including a urea water supply system according to the present invention. In the present embodiment, as the construction machine, a crawler type hydraulic shovel will be described by being cited as an example.

As shown in FIG. 1, the hydraulic shovel is constructed by including a traveling structure 1, a revolving superstructure 2 that is disposed on the traveling structure 1 and is mainly constituted of a revolving frame 3, and a working device 4 that is mounted to the revolving superstructure 2 and performs excavating work of earth and sand, and the like.

The working device 4 is constructed by including a boom 5 that is mounted to the revolving frame 3 rotatably in a vertical direction, an arm 6 that is mounted to a tip end of the boom 5 rotatably in the vertical direction, and a bucket 7 that is mounted to a tip end of the arm 6 rotatably in the vertical direction. The working device 4 includes a boom cylinder 5*a* that drives the boom 5, an arm cylinder 6*a* that drives the arm 6, and a bucket cylinder 7*a* that drives the bucket 7.

On the revolving frame 3, an operator's cab 8 for an operator to perform an operation manipulation of the hydraulic shovel is provided on a front side position, and on a rear side position, a counterweight 2*a* that secures a weight balance is provided. Further, a machine room 9 is provided between the operator's cab 8 and the counterweight 2*a*.

In the machine room 9, a hydraulic pump (not illustrated) that supplies pressure oil and an engine 10 that is a drive source for driving the hydraulic pump are installed. The pressure oil which is discharged from the hydraulic pump is supplied to a traveling motor provided in the traveling structure 1 and a revolving motor (both are not illustrated) provided in the revolving superstructure 2, whereby self propelling of the hydraulic shovel by the traveling structure 1 is enabled, and the revolving superstructure 2 is capable of revolving around a pivot together with the working device 4. Further, part of the pressure oil is also supplied to the boom cylinder 5a, the arm cylinder 6a and the bucket cylinder 7a which are provided at the working device 4, whereby the boom 5, the arm 6 and the bucket 7 are driven respectively in accordance with supply degrees of the pressure oil, that is, hydraulic pressures.

The engine 10 is a diesel engine, for example, and a muffler 12 is connected to an exhaust passage. Further, a diesel engine generally has a large amount of NOx (nitrogen oxide) contained in exhaust gas, and therefore, an exhaust after-treatment device 11 which is located on an exhaust upstream side from the muffler 12 and is for purifying exhaust gas components including NOx is interposed in an exhaust passage of the diesel engine. In the hydraulic shovel, the exhaust passage extends upward, and the exhaust after-treatment device 11 and the muffler 12 are installed on an upper side of the engine 10.

As a device for purifying NOx in the exhaust after-treatment device 11, a urea SCR system is mounted. The urea SCR system refers to a Selective Catalyst Reduction System using urea, that is, a selective catalytic reduction system which selectively reduces NOx by using urea water as a reducing agent, and refers to a device (NOx selective catalytic reduction device) that reduces and removes an NOx component in the exhaust gas by spraying urea water to an exhaust upstream side of the catalyst converter.

At the exhaust upstream side of the catalyst converter of the exhaust after-treatment device 11, a urea water injection valve 20 is provided, a urea water tank 24 in which the urea water is stored is connected to the urea water injection valve 20 via a urea water supply piping 22 that supplies the urea water to the urea water injection valve 20, and a urea water supply device 30 including a supply pump that feeds the urea water under pressure to the urea water injection valve 20 is interposed in the urea water supply piping 22.

Further, in a cold district and the like, urea water flowing in the urea water supply piping 22 is sometimes frozen in the winter season, a cooling water piping 40 for passing cooling water of the engine 10 extends from the engine 10 and the cooling water piping 40 is installed to be along the urea water supply piping 22 so as to be able to keep the urea water warm with heat of the cooling water of the engine 10 to prevent the urea water from being frozen or to defreeze the frozen urea water.

The urea water supply system is constructed of the urea water injection valve 20, the urea water supply piping 22, the urea water tank 24, the urea water supply device 30 and the cooling water piping 40.

Figure 2:
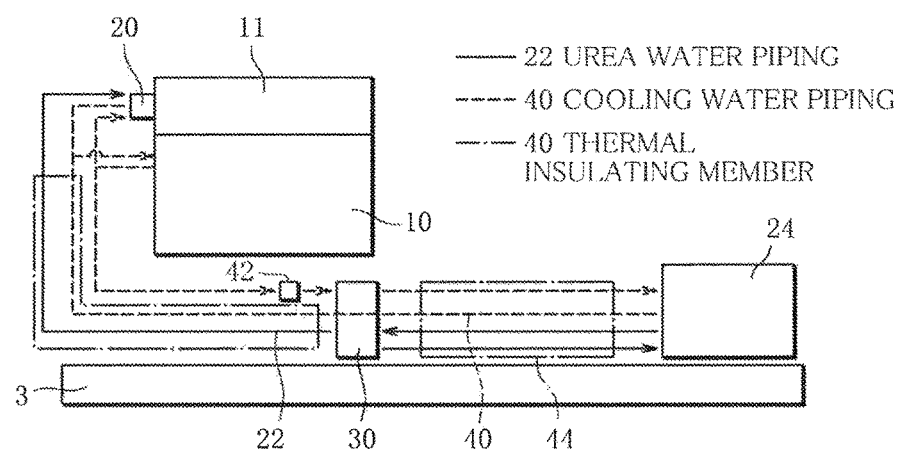
FIG. 2 is a diagram schematically showing a urea water supply system.

Referring to FIG. 2, the urea water supply system is schematically shown. In FIG. 2, the urea water supply piping 22 is shown by the solid line, and the cooling water piping 40 is shown by the broken line. As shown in the drawing, the urea water supply system is installed in the revolving frame 3, and the urea water supply piping 22 is constructed so that the urea water is sucked up from the urea water tank 24 by the urea water supply device 30 and is fed under pressure to the urea water injection valve 20 at a time of operation of the hydraulic shovel, and the excess urea water is returned to the urea water tank 24 from the urea water supply device 30 by the urea water supply device 30 at a time of stop of the hydraulic shovel. Meanwhile, the cooling water piping 40 is constructed so that the cooling water flows around the urea water injection valve 20 and flows around insides of the urea water supply device 30 and the urea water tank 24 along the urea water supply piping 22. Note that in the cooling water piping 40, a cooling water pressure-feeding pump 42 is interposed by being located at an upstream side of the urea water supply device 30, and the cooling water is fed under pressure by the cooling water pressure-feeding pump 42. In the urea water supply piping 22 and the cooling water piping 40, portions which are from the urea water supply device 30 to the urea water tank 21 and a portion where the cooling water returns from the urea water supply device 30 to the engine 10 are gathered together to be in contact with one another, and are covered with a thermal insulating member 44 so that the heat of the cooling water favorably transferred to the urea water and the urea water is kept warm.

Figure 3:
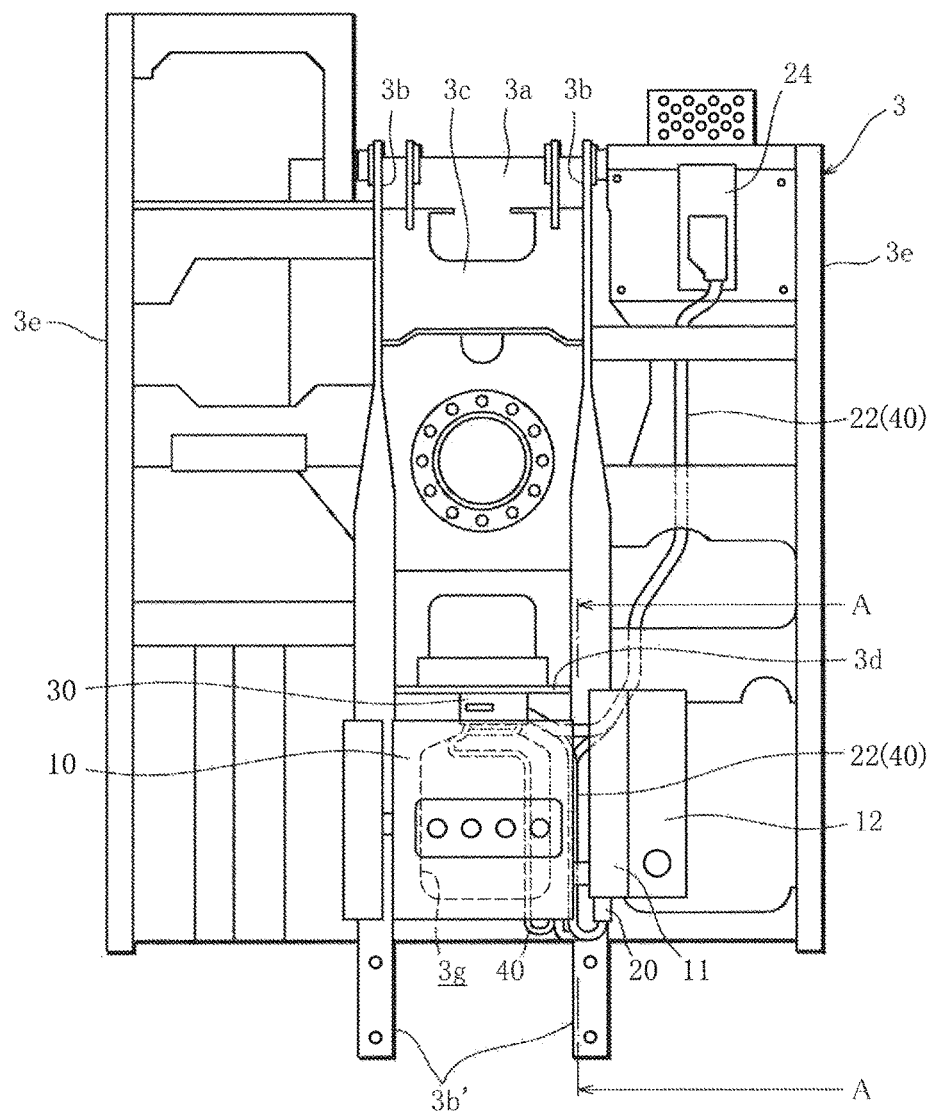
FIG. 3 is a plan view of a revolving frame of the construction machine showing the urea water supply system according to the present invention.
Figure 4:
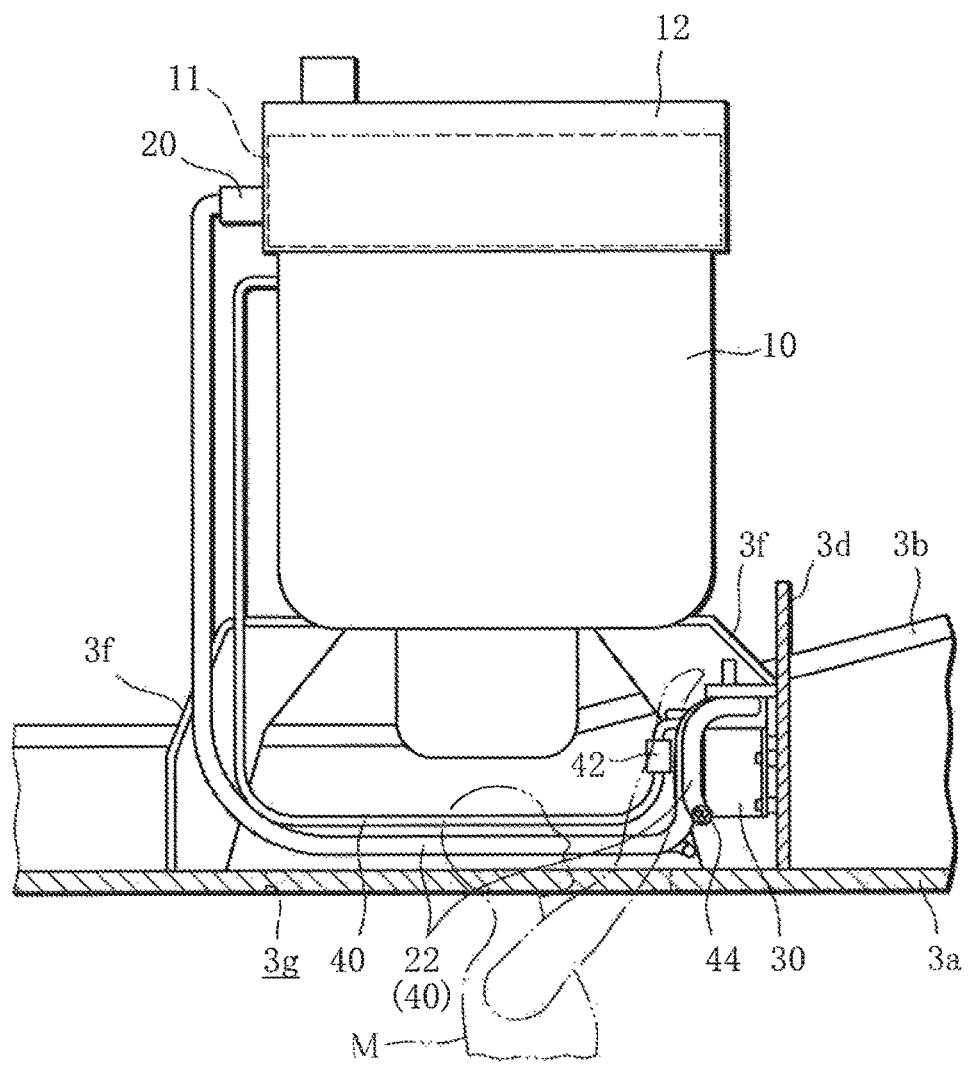
FIG. 4 is a vertical sectional view of the revolving frame which is taken along a line A-A in FIG. 3, and shows the urea water supply system according to the present invention.

Referring to FIG. 3, the urea water supply system according to the present invention which is installed on the revolving frame 3 is shown as a plan view of the revolving frame 3, and referring to FIG. 4, the urea water supply system according to the present invention is shown as a vertical sectional view of the revolving frame 3 taken along line A-A in FIG. 3.

As shown in FIG. 3, the revolving frame 3 is substantially constructed of a pair of center frame 3b and 3b that extend in a longitudinal direction in a center in a width direction with a predetermined space in the lateral direction to reinforce the revolving superstructure 2, a front connection frame 3c that connects the pair of center frames 3b and 3b at a front part, and a rear connection frame 3d that connects the pair of center frames 3b and 3b at a rear part, a pair of side frames 3e and 3e that are formed by connecting a plurality of overhanging beams extending outward in the lateral direction from the respective center frames 3b respectively with side beams extending in the longitudinal direction, and a plurality of bottom plates 3a that are mounted to the frames.

In the revolving frame 3 as above, the working device 4 is connected to the front parts of the center frames 3b. The engine 10 is placed on tail frame sections 3b' and 3b' that extend rearward from the center frames 3b and 3b via brackets 3f on a rear side from a center of the revolving frame 3. Note that in the bottom plate 3a, at a part directly under the engine 10, an opening portion 3g is provided for maintenance work, for a worker to perform maintenance (servicing) of the engine 10.

The urea water tank 24 is installed on the side frame 3e on a side opposite from the operator's cab 8 with the center frames 3b therebetween, in the front part of the revolving frame 3 so as to be away from the engine 10 as far as possible, in order to prevent degeneration of the urea water by heat of the engine 10, and because of excellent urea water replenishing workability.

The urea water supply device 30 is installed in a vicinity of the engine 10 and on the side of the center of the revolving frame 3 from the engine 10 by being located to face the engine 10. In more detail, as shown in FIG. 3 and FIG. 4, the rear connection frame 3d is an existing plate member that is laid between the pair of center frames 3b and 3b to be perpendicular to the bottom plate 3a, and is installed by being located at a lower part of a front side from the engine 10 so that the engine 10 faces a rear side of the rear connection frame 3d. The urea water supply device 30 is installed on a surface of the rear connection frame 3d on the engine 10 side to confront the engine 10 to face the engine 10.

Figure 5:
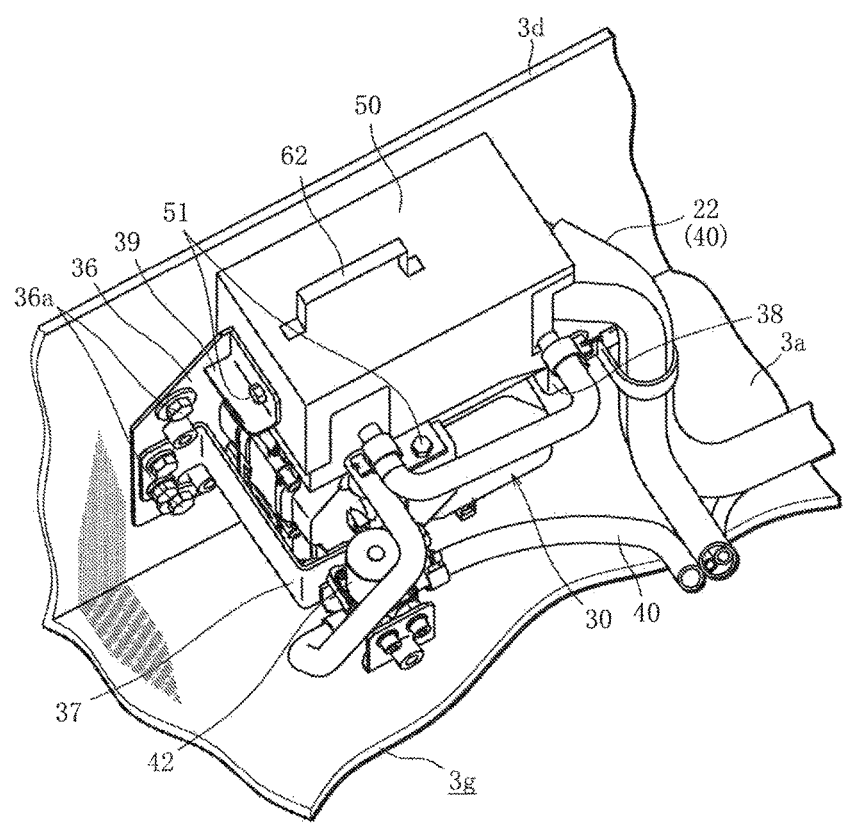
FIG. 5 is a perspective view showing a urea water supply device seen from diagonally above.

Referring to FIG. 5, a perspective view of the urea water supply device 30 seen front diagonally above is shown, and a construction of the urea water supply device 30 will be described hereinafter.

As shown in FIG. 5, the urea water supply device 30 is fixed to the rear connection frame 3d, and the urea water supply piping 22 and the cooling water piping 40 are connected to the urea water supply device 30 as described above. Further, a thermal insulating cover 50 is mounted to the urea water supply device 30 in such a manner as to cover a top portion of the urea water supply device 30.

In more detail, the urea water supply device 30 is fixed to the rear connection frame 3d by a plurality of bolts 36a via a base seat member 36. The base seat member 36 is constructed by integrally or separately including arm members 37, 38 and 39 for mounting the thermal insulating cover 50. The thermal insulating cover 50 is fastened to the arm members 37, 38 and 39 with bolts 51, and thereby is fixed to the base seat member 36, to the urea water supply device 30 by extension.

Figure 6:
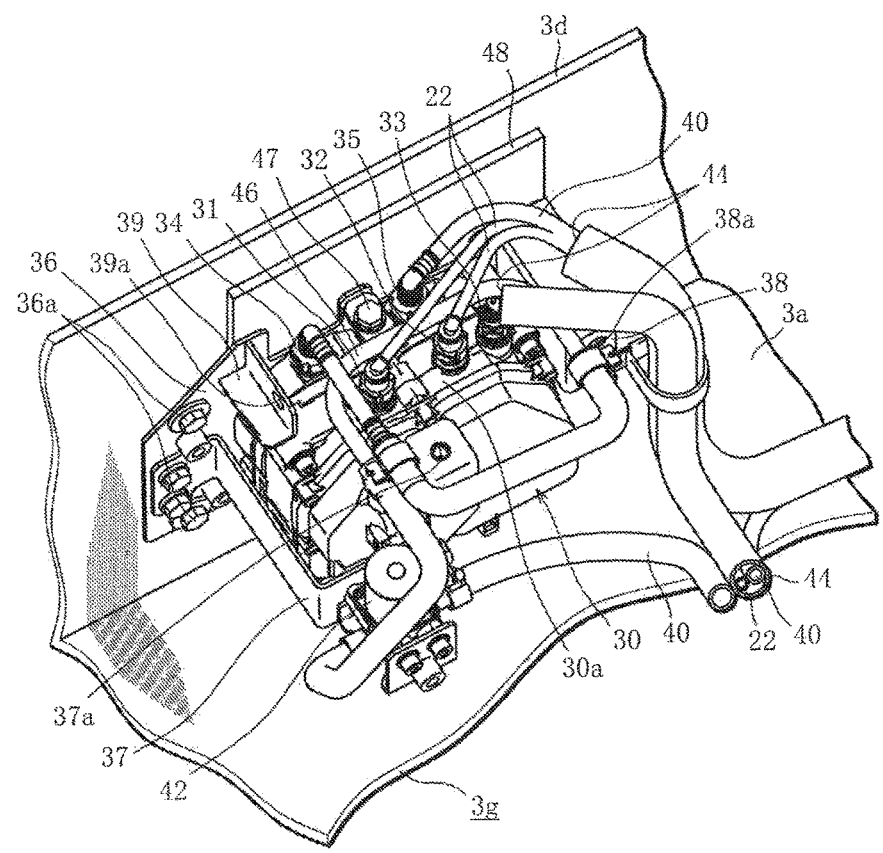
FIG. 6 is a perspective view of the urea water supply device in a state in which a thermal insulating cover is detached.

Referring to FIG. 6, the urea water supply device 30 in as state in which the thermal insulating cover 50 is detached is shown. As shown in FIG. 6, the urea water supply piping 22, the cooling water piping 40 and the urea water supply device 30 are respectively connected via connectors. In more detail, of the urea water supply piping 22, an inflow pipe in which the urea water flows from the urea water tank 24 is connected to the urea water supply device 30 with a connector 31, an outflow pipe that returns the urea water to the urea water tank 24 is connected to the urea water supply device 30 with a connector 32, and an outflow pipe that feeds the urea water to the urea water injection valve 20 is connected to the urea water supply device 30 with a connector 33. Further, of the cooling water piping 40, an inflow pipe in which the cooling water flows from the engine 10 is connected to the urea water supply device 30 with a connector 34, and an outflow pipe that feeds the cooling water to the urea water tank 24 is connected to the urea water supply device 30 with a connector 35.

Further, the connectors 31, 32, 33, 34 and 35 are all perpendicularly connected to a same outer surface of the urea water supply device 30, that is, a top surface 30a that is perpendicular to a surface of the rear connection frame 3d. The connectors 31, 32 and 33 of the urea water supply piping 22 and the connectors 34 and 35 of the cooling water piping 40 are installed to be aligned in straight lines in the vehicle body lateral direction parallel with the rear connection frame 3d and parallel with one another so that the connectors 34 and 35 are at the rear connection frame 3d side.

As shown in FIG. 6, of the cooling water piping 40, one portion (a portion extending to the connector 34) that is laid by extending and detouring onto the urea water supply device 30 in the inflow pipe in which the cooling water flows from the engine 10 via the cooling water pressure-feeding pump 42 is installed to be close to the connectors 31, 32 and 33 of the urea water supply piping 22 within a predetermined distance range. That is to say, in a vicinity of connection portions (the connectors 31, 32 and 33 portions) to the urea water supply device 30 in an end portion of the urea water supply piping 22, the cooling water piping 40 cannot be gathered up along the connection portions, and it is difficult to prevent freezing of the urea water and defreeze the frozen urea water. Therefore, of the cooling water piping 40, one portion that is extended and laid on the urea water supply device 30, in the inflow pipe in which the cooling water from the engine 10 flows is made a warming pipe section 46, and the warming pipe section 46 is brought close to the connectors 31, 32 and 33 to warm the portions in the vicinities of the connectors 31, 32 and 33 with heat of the cooling water which flows in the warming pipe section 46.

In more detail, the warming pipe section 46 is installed to extend between the connectors 31, 32 and 33 of the urea water supply piping 22, and the connectors 34 and 35 of the cooling water piping 40, along the top surface 30a of the urea water supply device 30, and cross the connectors 31, 32 and 33 which is perpendicular to the top surface 30a. The warming pipe section 46 is fixed to the top surface 30a with a bolt 47.

Here, the predetermined distance range within which the warming pipe section 46 is brought close to the connectors 31, 32 and 33 is a range where the heat of the cooling water flowing in the warming pipe section 46 reaches the connectors 31, 32 and 33, for example. Further, a portion where the warming pipe section 46 is close to the connectors 31, 32 and 33 is constructed of a member with high thermal conductivity, for example, a metal member such as a copper pipe and a steel pipe, so that the heat of the cooling water easily reaches the connectors 31, 32 and 33.

Here, as shown in FIG. 6, the urea water supply piping 22 extending from the connectors 31 and 32 extend parallel with the top surface 30a, and the warming pipe section 46 also crosses the urea water supply piping 22 extending from the connectors 31 and 32 by being laid close to the connectors 31, 32 and 33. That is to say, the warming pipe section 46 is installed to be also close to the portions of the urea water supply piping 22 along which the cooling water piping 40 in the vicinities of the connectors 31 and 32 cannot be laid. Thereby, not only the connectors 31, 32 and 33, but also the portions of the urea water supply piping 22 extending from the connectors 31 and 32 can be warmed simultaneously with the heat of the cooling water which flows in the warming pipe section 46.

Note that it is conceivable to provide a fin at the warming pipe section 46 in order to enhance heat dissipation performance, but if the fin is provided, the warming pipe section 46 cannot be brought close to the connectors 31, 32 and 33 on the contrary, and therefore, is preferable not to provide a fin at the warming pipe section 46.

Further, as shown in FIG. 6, on the arm members 38 and 39 provided at the base seat member 36, bolt screwing holes 37a, 38a and 39a for screwing the bolts 51 which mount the thermal insulating cover 50 are respectively formed.

Furthermore, on a surface of the rear connection frame 3d, on the urea water supply device 30 side, a thermal insulating member 48 is provided in such a manner that a lower portion is sandwiched with the rear connection frame 3d and the base seat, member 36. The thermal insulating member 48 is constructed of a urethane member, for example.

Figure 7:
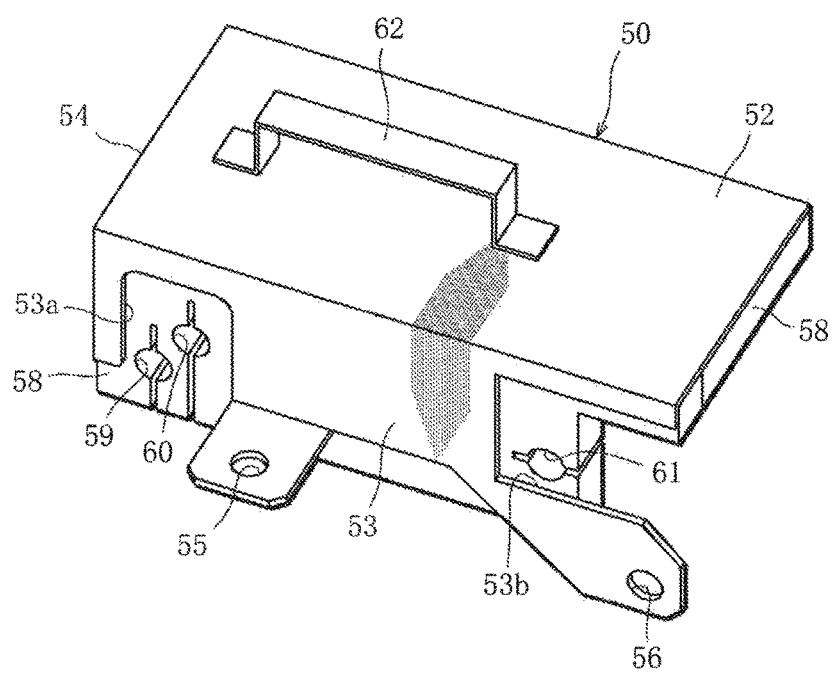
FIG. 7 is a perspective view showing a front side of the thermal insulating cover in a state detached from the urea water supply device.
Figure 8:
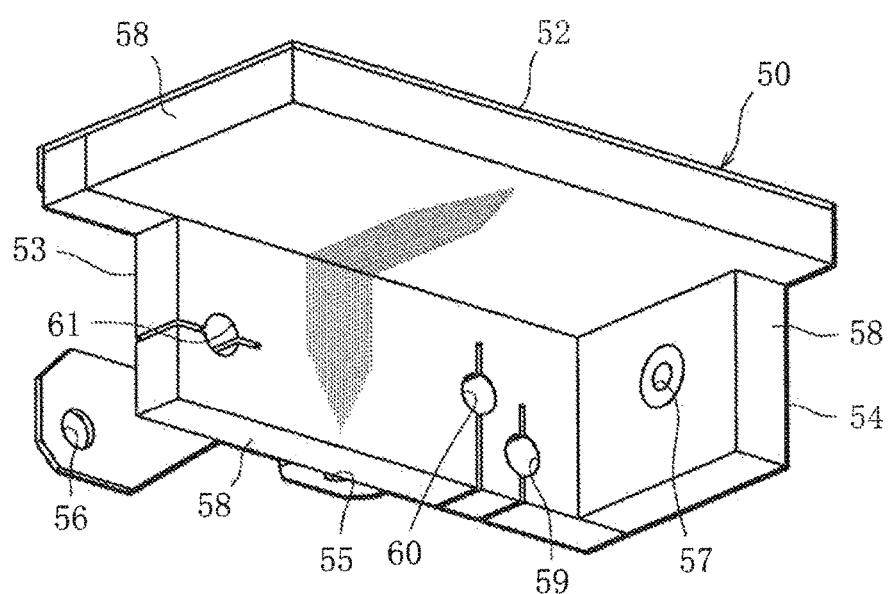
FIG. 8 is a perspective view showing a back side of the thermal insulating cover in the state detached from the urea water supply device.

Referring to FIG. 7 and FIG. 8, a front side and a back side of the thermal insulating cover 50 in a state detached from the urea water supply device 30 are respectively shown in perspective views. The thermal insulating cover 50 is constructed of a top surface 52, a first side surface 53 formed parallel with the rear connection frame 3d and a second side surface 54 formed perpendicularly to the rear connection frame 3d, by working a steel plate, for example. At the first side surface 53, bolt insertion holes 55 and 56 through which the bolts 51 are inserted to mount the thermal insulating cover 50 to the arm members 37 and 38 provided on the base seat member 36 are formed, and at the second side surface 54, a bolt insertion hole 57 through which the bolt 51 is inserted to mount the thermal insulating cover 50 to the arm member 39 provided at the base seat member 36 is formed.

As shown in FIG. 8, a thermal insulating member 58 is provided on a back side of the thermal insulating cover 50, that is, surfaces on the urea water supply device 30 side, of the top surface 52, the first side surface 53 and the second side surface 54. The thermal insulating member 58 is formed of a urethane member, for example, similarly to the above described thermal insulating member 48, and has substantially the same thickness as the thermal insulating member 48.

Cutout portions 53a and 53b are provided in the first side surface 53 of the thermal insulating cover 50 to avoid interference with the above described urea water supply piping 22 and cooling water piping 40, and the thermal insulating member 58 is provided to close the cutout portions 53a and 53b while through-holes 59, 60 and 61 for passing the urea water supply piping 22 and the cooling water piping 40 are left.

The above described thermal insulating member 48 and thermal insulating member 58 are constructed so that the thermal insulating member 58 which is arranged on the top surface 52 abuts on an upper end edge of the thermal insulating member 48, and a side end edge of the thermal insulating member 58 which is arranged on the second side surface 54 abuts on a surface of the thermal insulating member 48, when the thermal insulating cover 50 is mounted on the urea water supply device 30. That is to say, the thermal insulating cover 50 is constructed so that an open surface at the rear connection frame 3d side, which faces the first side surface 53 is closed with the thermal insulating member 48 arranged on the surface of the rear connection frame 3d, and by extension, the rear connection frame 3d, by being mounted on the urea water supply device 30. Note that a surface facing the second side surface 54 remains to open, but the surface is brought into a substantially closed state by the thermal insulating member 44 for the urea water supply piping 22 and the cooling water piping 40. Thereby, the connectors 31, 32 and 33 of the urea water supply piping 22 and the connectors 34 and 35 of the cooling water piping 40 are covered with the thermal insulating cover 50 together with the warming pipe section 46, and a closed space substantially enclosed by the top surface 52, the first side surface 53, the second side surface 54, the rear connection frame 3d, and the thermal insulating member 48 is formed inside the thermal insulating cover 50. Therefore, air in the closed space is warmed by the heat of the cooling water flowing in the warming pipe section 46, and is favorably kept warm by actions of the thermal insulating member 48 and the thermal insulating member 58.

Reference numeral 62 designates a handle of the thermal insulating cover 50, and the handle 62 has a strength thereof set so as to not only, attach and detach the thermal insulating cover 50, but also to be able to carry the thermal insulating cover 50, the base seat member 36 and the urea water supply device 30 integrally even in a state in which the thermal insulating cover 50 is mounted to the urea water supply device 30 via the base seat member 36.

Figure 9:
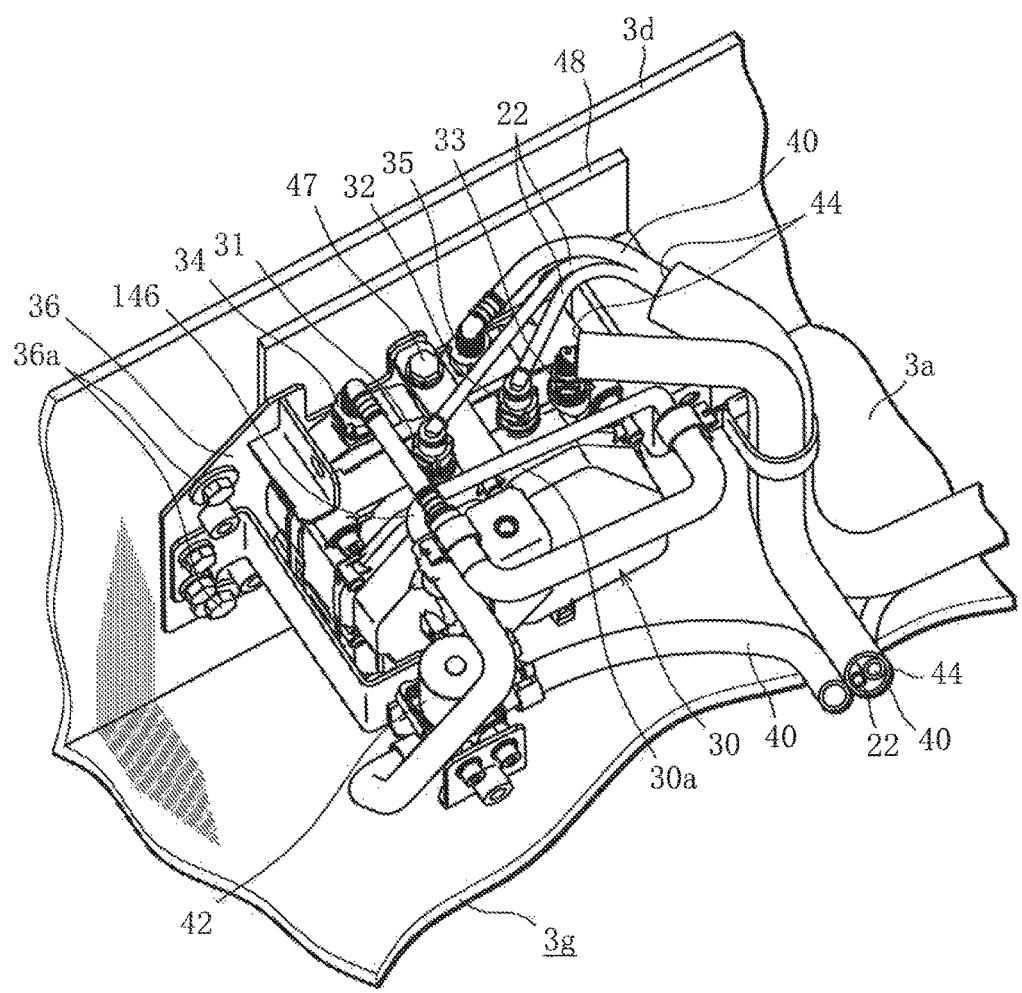
FIG. 9 is a view showing a first modification of how to bring cooling water piping close to a connector of urea water supply piping.
Figure 10:
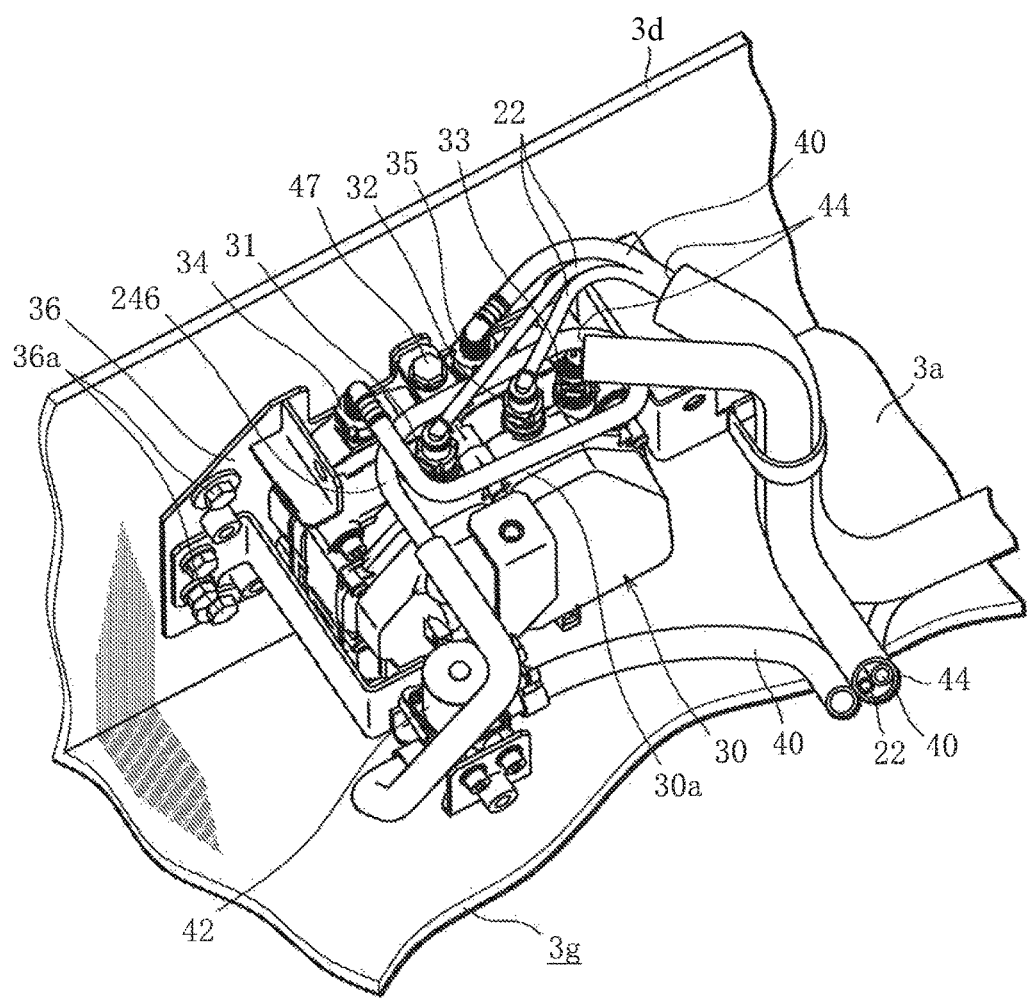
FIG. 10 is a view showing a second modification of how to lay the cooling water pipe close to the connector of the urea water supply piping.
Figure 11:
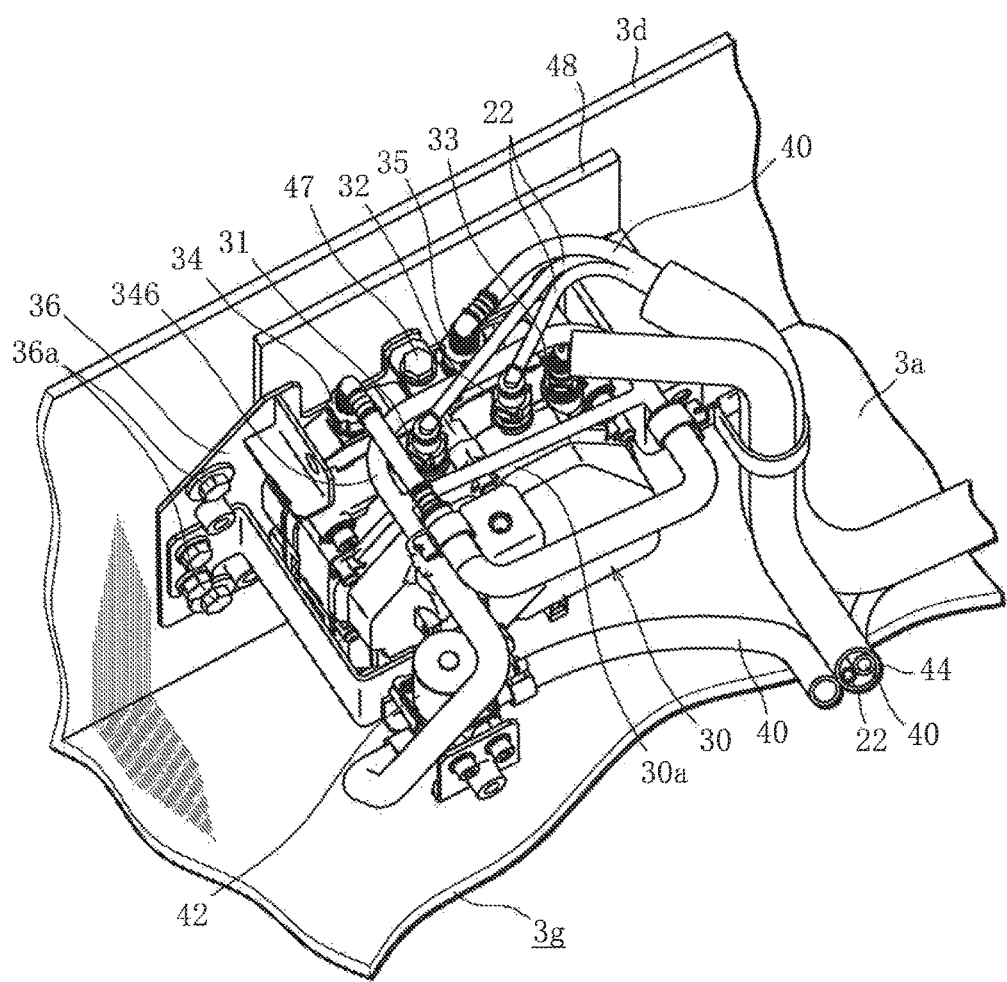
FIG. 11 is a view showing a third modification of how to bring the cooling water piping close to the connector of the urea water supply piping.

Incidentally, the way of laying the cooling water piping 40 close to the connectors 31, 32 and 33 of the urea water supply piping 22 is not limited to the above description, and various modifications are conceivable as shown in FIGS. 9 to 11.

FIG. 9 shows a first modification. In the first modification, one portion that is extended and laid on the urea water supply device 30, in the inflow pipe in which the cooling water from the engine 10 flows, of the cooling water piping 40 is formed as a warming pipe section 146. The warming pipe section 146 is installed to cross the connectors 31, 32 and 33 of the urea water supply piping 22 on a side opposite from the connectors 34 and 35 of the cooling water piping 40.

FIG. 10 shows a second modification. In the second modification, one portion that is extended and laid on the urea water supply device 30, in the inflow pipe in which the cooling water from the engine 10 flows, of the cooling water piping 40 is formed as a warming pipe section 246. The warming pipe section 246 is installed to extend between the connectors 31, 32 and 33 of the urea water supply piping 22 and the connectors 34 and 35 of the cooling water piping 40 to cross the connectors 31, 32 and 33, and to also cross the connectors 31, 32 and 33 on a side opposite from the connectors 34 and 35 of the cooling water piping 40 by being formed in series. That is to way, the warming pipe section 246 is installed to surround the connectors 31, 32 and 33 by being formed in series.

FIG. 11 shows a third modification. In the third modification, one portion that is extended and laid on the urea water supply device 30, in the inflow pipe in which the cooling water from the engine 10 flows, of the cooling water piping 40 is formed as a warming pipe section 346. The warming pipe section 346 is installed to extend between the connectors 31, 32 and 33 of the urea water supply piping 22 and the connectors 34 and 35 of the cooling water piping 40 to cross the connectors 31, 32 and 33, and to also cross the connectors 31, 32 and 33 on the side opposite from the connectors 34 and 35 of the cooling water piping 40 by being formed in parallel. That is to say, the warming pipe section 34b is installed to surround the connectors 31, 32 and 33 by being formed in parallel.

Hereinafter, an operation and an effect of the urea water supply system of the construction machine which is constructed as above will be described in detail.

As described above, the urea water tank 24 is installed on the side frame 3e of the front part of the revolving frame 3, while the urea water supply device 30 is installed on the surface of the rear connection frame 3d on the engine 10 side in the vicinity of the engine 10 to face the engine 10.

Thereby, the urea water tank 24 is not influenced by the heat of the engine 10, while the urea water supply device 30 is warmed by the heat of the engine 10, whereby even in the winter season, freezing of the urea water flowing in the urea water supply device 30 is prevented and defreezing of the frozen urea water is promoted.

Further, in this case, the urea water supply device 30 is installed on the surface of the rear connection frame 3d on the engine 10 side to face the engine 10, and therefore, the urea water supply device 30 can be installed easily and favorably by effectively using the existing rear connection frame 3d which is a plate member without providing a mounting bracket additionally. In this case, the opening portion 3g is provided for maintenance work of the engine 10 and the like in a portion directly under the engine 10, in the bottom plate 3a of the revolving frame 3, and therefore, maintenance work of the urea water supply device 30 can be easily performed by using the opening portion 3g.

Figure 12:
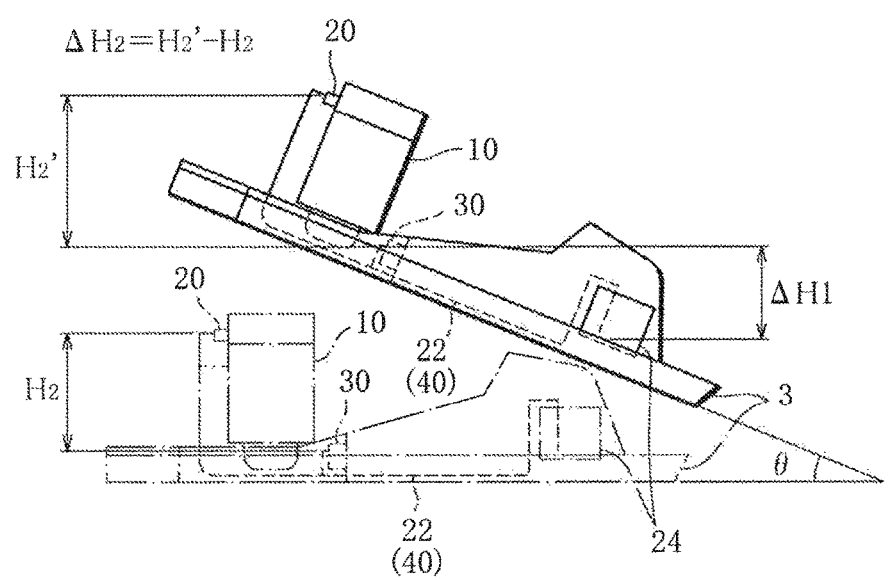
FIG. 12 is a schematic diagram of a revolving frame and the urea water supply system from a side, and is a diagram explaining an effect of the present invention.

When the urea water supply device 30 is installed on the surface of the rear connection frame 3d on the engine 10 side to face the engine 10 as above, the distance from the urea water tank 24 to the urea water supply device 30 does not become too long, and the distance from the urea water supply device 30 to the urea water injection valve 20 does not become too long. As a result, while FIG. 12 schematically shows a view of the revolving frame 3 and the urea water supply system seen from a side, even when the construction machine tilts to a predetermined inclination limit angle θ by lowering a front side in the longitudinal direction in a slope or the like (a solid line) from a state in a flatland (an alternate long and short dash line), a change in a distance in the vertical direction from the urea water tank 24 to the urea water supply device 30 is restrained to be small. That is to say, when a urea water sucking position of the urea water tank 24 is substantially the same height in the vertical direction as the urea water supply device 30 in the flatland, a change amount in the vertical direction in a slope or the like is ΔH1 in a specified value range where the urea water supply device 30 sucks the urea water from the urea water tank 24 without hindrance, and the urea water sucking performance of the urea water supply device 30 from the urea water tank 24 is favorably ensured with a slight variation.

Likewise, a change in a distance in the vertical direction from the urea water supply device 30 to the urea water injection valve 20 can be restrained to be small. That is to say, when a distance from the urea water supply device 30 to the urea water injection valve 20 in a flatland is H2, and a distance at the time of tilting to the predetermined inclination limit angle θ is H2', a change amount in the vertical direction is ΔH2 (ΔH2=H2'−H2) within a specified value range where there is no hindrance in the discharge pressure of the urea water in the urea water injection valve 20, and the discharge pressure of the urea water of the urea water supply device 30 to the urea water injection valve 20 is also ensured favorably with a slight variation.

Thereby, the urea water can be always injected stably from the urea water injection valve 20.

Further, in the urea water supply device 30, one portion which is extended and laid on the urea water supply device 30, in the inflow pipe in which the cooling water from the engine 10 flows, of the cooling water piping 40 is formed as the warming pipe section 46, 146, 246 or 346, the warming pipe section 46, 146, 246 or 346 is brought close to the connectors 31, 32 and 33 which are the connection portions of the urea water supply piping 22 to the urea water supply device 30, and the connectors 31, 32 and 33 portions are warmed with the heat of the cooling water flowing in the warming pipe section 46. Therefore, even in the connectors 31, 32 and 33 portions along which the cooling water piping 40 cannot be laid, freezing of the urea water can be prevented and the frozen urea water can be defreezed efficiently with the simple structure.

In this case, when the warming pipe sections 246 and 346 are constructed to surround the connectors 31, 32 and 33 as in the above described second and third modifications, the connector 31, 32 and portions can be sufficiently warmed with the heat of the cooling water flowing in the warming pipe sections 236 and 346.

In particular, at a stopping time of the hydraulic shovel, the urea water is returned to the urea water tank 24 from the urea water supply device 30. At this time, the urea water sometimes remains in the urea water supply piping 22 between the urea water supply device 30 and the urea water tank 24, and the urea water also sometimes remains in the connector 32 portion which is the connection portion of the outflow pipe which returns the urea water to the urea water tank 24. However, by warming the urea water with the heat of the cooling water flowing in the warming pipe section 46, freezing of the urea water in the connector 32 portion can be prevented and the frozen urea water can be defrosted reliably.

Furthermore, the thermal insulating cover 50 is provided on the urea water supply device 30 so as to cover the connectors 31, 32 and 33 of the urea water supply piping 22, the connectors 34 and 35 of the cooling water piping 40 and the warming pipe section 46, whereby the air warmed by the heat of the cooling water flowing in the warming pipe section 46 inside the thermal insulating cover 50 is favorably kept warm. In this case, the thermal insulating cover 50 is constructed of the top surface 52, the first side surface 53 and the second side surface 54 with the thermal insulating member 58 placed on the inner surfaces, and the closed space is formed in the thermal insulating cover 50 so that the opened surface at the rear connection frame 3d side confronting the first side surface 53 is closed with the rear connection frame 3d with the thermal insulating member 48 placed on the surface. Therefore, the thermal insulating cover 50 can be constructed to be simple by efficiently using the existing rear connection frame 3d formed of the plate member.

When the thermal insulating cover 50 is constructed as above, a worker M can easily attach and detach the thermal insulating cover 50 of the urea water supply device 30 from the opening portion 3g for maintenance work, as FIG. 4 shows the worker M together, and the maintenance work of the urea water supply device 30 can be performed more easily.

Explanation of the embodiment will be finished, and the mode of the present invention is not limited to the above described embodiment.

For example, in the above described embodiment, the one portion (the portion extending toward the connector 34) which is extended and laid on the urea water supply device 30, in the inflow pipe in which the cooling water from the engine 10 flows, of the cooling water piping 40 is formed as the warming pipe section 46, 146, 246 or 346, but the warming pipe section may be constructed of one portion to portion extending from the connector 35) that is extended and laid on the urea water supply device 30, in the outflow pipe from which the cooling water from the engine 10 flows out, of the cooling water piping 40.

Further, in the above described embodiment, in the urea water supply device 30, the warming pipe sections 46, 146, 246 or 346 is constructed of the one portion of the cooling water piping 40, and the warming pipe section 46, 146, 246 or 346 is brought close to the connectors 31, 32 and 33 which is the connection portion of the urea water supply piping 22 to the urea water supply device 30. However, when the connector as the connection portion of the urea water supply piping 22 to the urea water tank 24, and the connector as the connection portion of the cooling water piping 40 to the urea water tank 24 are provided at the urea water tank 24, one portion of the inflow pipe in which the cooling water from the engine 10 flows or one portion of the outflow pipe from which the cooling water flows out, in the cooling water piping 40, is formed as the heating pipe section, in the urea water tank 24, and the warming pipe section may be brought close to the connector which is the connection portion of the urea water supply piping 22 to the urea water tank 24.

Further, in the above described embodiment, in the urea water supply device 30, the cooling water piping 40 is extended to construct the warming pipe section 46, 146, 246 or 346, and the connectors 31, 32 and 33 which are the connection portions of the urea water supply piping 22 to the urea water supply device 30 and the connectors 34 and 35 of the cooling water piping 40 including the warming pipe section 46, 146, 246 or 346 are covered with the thermal insulating cover 50, but the connectors 31, 32, 33, 34 and 35 may be covered with the thermal insulating cover 50 without providing the warming pipe sections 46, 146, 246 or 346 in the urea water supply device 30. In this case, the throughholes 60 and 61 for passing the cooling water piping 40 through do not have to be provided in the thermal insulating member 58.

Further, in the above described embodiment, the crawler type hydraulic shovel is cited and described as an example, as the construction machine, but the construction machine is not limited to this, and as long as the engine includes the urea SCR system, the present invention may be applied to a wheel type hydraulic shovel, and also can be widely applied to hydraulic shovels for use at a harbor or on a ship, which have no traveling structure, besides construction machines such as a lift truck, a damp truck, a wheel loader, a hydraulic crane, and a bulldozer.

EXPLANATION OF REFERENCE SIGNS

1 Traveling structure
2 Revolving superstructure
3 Revolving frame
3b Center frame
3d Rear connection frame
4 Working device
9 Machine room
10 Engine
11 Exhaust after-treatment device
20 Urea water injection valve
22 Urea water supply piping
24 Urea water tank
30 Urea water supply device
31, 32, 33, 34, 35 Connector
40 Cooling water piping
46, 146, 246, 346 Warming pipe section
48 Thermal insulating member
50 Thermal insulating cover
58 Thermal insulating member

The invention claimed is:

1. A urea water supply system for a construction machine, comprising:
an engine as a drive source placed on a revolving superstructure;
a NOx selective catalytic reduction device interposed in an exhaust passage of the engine;
a urea water injection valve that injects urea water to an exhaust upstream side of the NOx selective catalytic reduction device;
a urea water tank that stores the urea water;
urea water supply piping with one end connected to the urea water injection valve, and the other end connected to the urea water tank;
a urea water supply device that is interposed in the urea water supply piping, and feeds the urea water under pressure to the urea water injection valve;
a plurality of connectors which connect the urea water supply piping to the urea water supply device, and
cooling water piping that extends along the urea water supply piping, allows cooling water of the engine to flow through and is connected to the urea water supply device,
wherein:
the urea water supply piping comprises a first piping in which the urea water flows from the urea water tank to the urea water supply device, a second piping which returns the urea water from the urea water supply device to the urea water tank, and a third piping which feeds the urea water under pressure from the urea water supply device to the urea water injection valve,
the connectors comprise a first connector which connects the first piping to the urea water supply device, a second connector which connects the second piping to the urea water supply device, a third connector which connects the third piping to the urea water supply device, a fourth connector, and a fifth connector,
the cooling water piping comprises an inflow pipe connected to the urea water supply device with the fourth connector and in which the cooling water flows from the engine, and an outflow pipe connected to the urea water supply device with the fifth connector and which feeds the cooling water from the urea water supply device to the urea water tank,
the first connector, the second connector, the third connector, the fourth connector and the fifth connector are disposed perpendicularly to a respective same outer surface of the urea water supply device, and
the inflow pipe includes a warming pipe section disposed to extend to cross the first connector, the second connector and the third connector of the urea water supply piping between the first connector, the second connector, the third connector of the urea water supply piping and the fourth connector, the fifth connector of the cooling water piping, and to further extend to cross the first connector, the second connector and the third connector of the urea water supply piping on a side thereof opposite to the fourth connector and the fifth connector to surround the first connector, the second connector and the third connector.

2. The urea water supply system for a construction machine according to claim 1,
wherein the first connector, the second connector and the third connector are disposed in a line on the respective same outer surface of the urea water supply device, and the warming pipe section surrounds the first connector, the second connector and the third connector.

3. The urea water supply system for a construction machine according to claim 1, further comprising:
a thermal insulating cover that covers and keeps the warming pipe section, the first connector, the second connector and the third connector warm.

* * * * *